(12) United States Patent
Paul et al.

(10) Patent No.: US 7,734,582 B2
(45) Date of Patent: Jun. 8, 2010

(54) APPARATUS, SYSTEM, AND METHOD FOR CACHE SYNCHRONIZATION

(75) Inventors: Vipul Paul, Hillsboro, OR (US); Scott Alan Piper, Bothell, WA (US); Sudhir Gurunandan Rao, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 10/989,664

(22) Filed: Nov. 16, 2004

(65) Prior Publication Data

US 2006/0106890 A1    May 18, 2006

(51) Int. Cl.
*G06F 7/00* (2006.01)
*G06F 17/00* (2006.01)

(52) U.S. Cl. .............. 707/613; 707/610; 707/687; 707/704

(58) Field of Classification Search .............. None
See application file for complete search history.

(56) References Cited

U.S. PATENT DOCUMENTS

| | | | |
|---|---|---|---|
| 6,195,729 B1 | 2/2001 | Arimilli et al. | 711/119 |
| 6,490,660 B1 | 12/2002 | Gilda et al. | 711/141 |
| 6,549,989 B1 | 4/2003 | Arimilli et al. | 711/144 |
| 6,574,654 B1 * | 6/2003 | Simmons et al. | 718/104 |
| 6,587,921 B2 * | 7/2003 | Chiu et al. | 711/119 |
| 6,769,048 B2 * | 7/2004 | Goldberg et al. | 711/141 |
| 2003/0028695 A1 * | 2/2003 | Burns et al. | 710/200 |
| 2003/0105837 A1 * | 6/2003 | Kamen et al. | 709/220 |
| 2003/0110358 A1 | 6/2003 | Goldberg et al. | 711/141 |
| 2003/0236950 A1 | 12/2003 | Clarke et al. | 711/144 |
| 2003/0236957 A1 * | 12/2003 | Miller et al. | 711/163 |
| 2004/0034747 A1 | 2/2004 | Rowlands et al. | 711/148 |

OTHER PUBLICATIONS

"CIFS", www.webopedia.com/TERM/C/COFS.html Sep. 20, 2004.

* cited by examiner

*Primary Examiner*—Tim T. Vo
*Assistant Examiner*—Garrett Smith
(74) *Attorney, Agent, or Firm*—Kunzler Needham Massey & Thorpe (57) ABSTRACT

An apparatus, system, and method are disclosed for cache synchronization within a multi-tier system having multiple client-server relationships. The apparatus includes a pre-synchronization module, a locking module, and a synchronization module. The pre-synchronization module receives a pre-synchronization call from an upstream node coupled to a first downstream node. The locking module locks a first cache coupled to the first downstream node in response to a synchronization call from the upstream node. The synchronization module synchronizes source data on the upstream node with cached data on the first cache. The apparatus also may include a post-synchronization module to perform any necessary cleanup activities. Advantageously, the apparatus, system, and method reduce the likelihood of a system deadlock due to premature locking of the first downstream cache, which prevents a subsequent downstream cache from synchronizing with the first cache.

19 Claims, 8 Drawing Sheets

APPARATUS, SYSTEM, AND METHOD FOR CACHE SYNCHRONIZATION

BACKGROUND

1. Technological Field

This invention relates to cache synchronization and more particularly relates to synchronizing cascading caches within a multi-tier environment.

2. Background Technology

In a client-server environment, it is common for a client to cache data that is owned by the server. In other words, the client stores a copy of data from the server on, for example, random access memory (RAM), such as local RAM, that is coupled to the client. In this way, the client can access and modify this cached data locally without requiring communication across a network or other communication channel in order to access the data remotely at the server. The time, processor, and network traffic savings can result in a significant increase in performance of the client-server system.

When the client caches data from the server, the server typically prevents other clients or applications from removing or modifying the data on the server. The client, in one sense, checks out the data from the server and the server may prevent other clients from interrupting that access. In some situations, however, it may be useful to call back the data from the client in order to fulfill a data access request from another client. For example, if another client requires access to the same data, the server may request that the first client synchronize its cached data with the server. In a typical synchronization operation, the client sends the cached data, including any modifications, back to the server and discontinues caching the data locally. The server then has the most recent data available. Sending the cached, modified data back from the client to the server may be referred to as flushing the data back to the server.

In order to prevent a client application or other user from further modifying the cached data while the client flushes the data back to the server, the client conventionally locks the cached data in response to the synchronization call from the server and throughout the synchronization operation. The client releases the lock, or unlocks the cache, only when the cache flush is complete. The client typically responds to the synchronization call-back to notify the server that the synchronization is complete.

Figure 1:
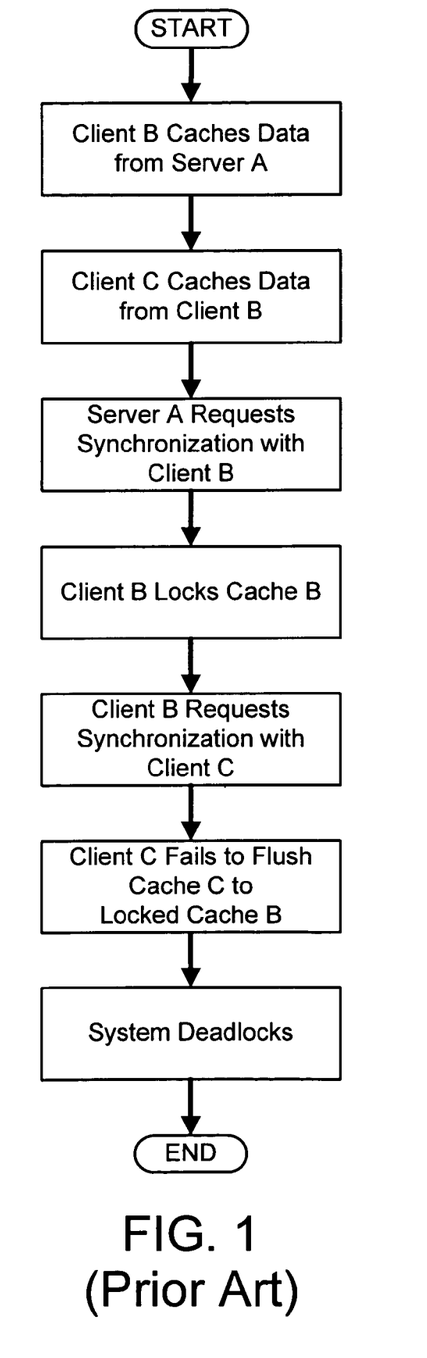
FIG. 1 is a schematic flow chart diagram illustrating a conventional synchronization deadlock.

The conventional synchronization technology can halt an entire system when applied to a multi-tier system in which cascaded caching and synchronization are present. One example of a multi-tier architecture or environment is an enterprise application running in an application/database server on top of a database/file server. FIG. 1 depicts a conventional synchronization deadlock within a multi-tier system. A simple multi-tier system includes three nodes, which may be referred to as nodes A, B, and C. Nodes A and B form a first client-server relationship and, similarly, nodes B and C form a second client-server relationship at a downstream level. Node B, acting as a client of node A may cache data from node A. Subsequently, node C, acting as a client of node B, may cache data from node B, including some or all of the data originally obtained by node B from node A.

When node A receives a data access request from another client, node A, acting as a server, may request that node B, acting as a client, synchronize (flush back) its cached data. Conventionally, node B locks its cache in response to the synchronization request from node A. With the cache coupled to node B locked, the data cached by node B is unavailable for any modifications. However, node B, acting as a server, recognizes that some of the data that is requested by node A has been cached downstream by node C, acting as a client. Node B, therefore, sends a synchronization request to node C.

Unfortunately, node C cannot flush back its cached data to node B because node B has locked its cache in response to the synchronization request from node A. In this scenario, the entire system may deadlock while node A waits for node B to flush back, node B waits for node C to flush back, and node C waits for node B to unlock its cache so node C can flush back.

One specific example of this problem is apparent in a system where node A is a Storage Area Network (SAN) File System meta-data server, node B is an IBM® TotalStorage SAN File System client to node A, node B also acts as a Common Internet File System (CIFS) server, and node C is a CIFS client to node B. The potential for system deadlock increases substantially if node B supports the CIFS Oplocks protocol, which uses an inverted-locking model that considers locks granted while corresponding synchronization requests are pending.

Multi-phase commit protocols, such as two phase commit, exist and are used within the distributed transaction and protocol environments. However, these protocols are used only for distributed agreement, voting, and potentially locking within a cluster or single-tier or two-tier systems. Multi-phase commit protocols have not been implemented within multi-tier systems having more than two tiers.

From the foregoing discussion, it should be apparent that a need exists for an apparatus, system, and method for cache synchronization within a multi-tier environment. Beneficially, such an apparatus, system, and method would overcome the present synchronization challenges that allow synchronization deadlocks.

SUMMARY

The several embodiments of the present invention have been developed in response to the present state of the art, and in particular, in response to the problems and needs in the art that have not yet been fully solved by currently available cache synchronization systems. Accordingly, the present invention has been developed to provide an apparatus, system, and method for data comparison that overcome many or all of the above-discussed shortcomings in the art.

The apparatus to synchronize cache data is provided with a logic unit containing a plurality of modules configured to functionally execute the necessary operations for cache synchronization. These modules in the described embodiments include a synchronization module, a pre-synchronization module, a post-synchronization module, a caching module, a call-back module, and a locking module.

In one embodiment, the synchronization module synchronizes data from two nodes in a client-server environment. The synchronization module also may participate in administrative communications between the participating nodes. In another example, the synchronization module may facilitate cascading cache synchronization with one or more upstream and/or downstream nodes.

In one embodiment, the pre-synchronization module may send a pre-synchronization call to a downstream node acting as a client. In another embodiment, the pre-synchronization module may receive a pre-synchronization call from an upstream node acting as a server. In a further embodiment, the pre-synchronization module may send or receive a pre-synchronization acknowledgement, which indicates that the downstream node is ready to receive a synchronization call-back from the upstream node.

In one embodiment, the post-synchronization module may send or receive a post-synchronization call and/or a corresponding post-synchronization acknowledgement. By implementing pre- and post-synchronization communications between an upstream node and a downstream node, the caching apparatus may avoid deadlocks within a multi-tier system.

In one embodiment, the caching module caches data from an upstream node in a local or remotely-coupled cache. The ability of the caching apparatus to cache data may be related to the operation of the other modules, including the locking module.

In one embodiment, the call-back module sends a synchronization call-back, or request, from one node to another. Additionally, the call-back module may send a pre-synchronization call and/or a post-synchronization call from one node to another. In another embodiment, the call-back module may send the synchronization, the pre-synchronization, and/or the post-synchronization call-back(s) in conjunction with the locking module.

In one embodiment, the locking module locks and unlocks a cache coupled to a node. For example, the locking module may lock the cache in response to a synchronization call-back from an upstream node. The locking module also may unlock the cache in response to completion of the synchronization operations. By locking a cache, the locking module prevents the node, to which the cache is coupled, or an application on the node from modifying some or all of the cached data within the cache. In particular, the locking module prevents an application or user from accessing the data that is cached from an upstream node and that may be synchronized with the upstream data.

In one embodiment, the locking module locks a cache in response to a synchronization call-back from an upstream node and unlocks the cache prior to sending a synchronization completion notification to the upstream node. In a further embodiment, the locking module may prevent locking of the cache during either the pre-synchronization or the post-synchronization communications.

A system of the present invention is also presented to synchronize cache data. In on embodiment, the system may be embodied in a multi-tier system having three or more nodes. In particular, the system, in one embodiment, may include an upstream node, an intermediate node, and a downstream node. In another embodiment, the system may have a server, a first downstream node, and a second downstream node. The system further includes a caching apparatus to synchronize the cached data coupled to the downstream (e.g., second downstream) node with the cached data coupled to the intermediate (e.g., first downstream) node prior to synchronizing the cached data coupled to the intermediate (e.g., first downstream) node with the data coupled to the upstream node (e.g., server)

In another embodiment, the system also may include a pre-synchronization module to receive a pre-synchronization call from the upstream node to the intermediate node in anticipation of the synchronization operations. In another embodiment, the system may include a locking module to maintain a first cache, coupled to the intermediate node, unlocked in response to the pre-synchronization call and prior to a synchronization call from the upstream node. The locking module also may lock the first cache in response to the synchronization call from the upstream node.

A signal bearing medium is also presented to store a program that, when executed, performs one or more operations to synchronize cache data. In one embodiment, the operations include receiving a pre-synchronization call from an upstream node coupled to a first downstream node, locking a first cache coupled to the first downstream node in response to a synchronization call from the upstream node, and synchronizing source data on the upstream node with cached data on the first cache.

In another embodiment, the operations also may include sending a synchronization call-back from the first downstream node coupled to a second downstream node to synchronize the cached data on the first cache with cached data on a second cache coupled to the second downstream node. In another embodiment, the operations also may include sending the synchronization call-back before the first cache is locked. In another embodiment, the operations also may include locking the first cache in response to completion of the synchronization of the first and second caches.

In another embodiment, the operations also may include receiving a post-synchronization call from the upstream node to the first downstream node in response to completion of the synchronization of the first cache with the upstream node. In another embodiment, the operations also may include caching the source data from the upstream node on the first cache of the first downstream node. In another embodiment, the operations also may include preventing the first downstream node from modifying the cached data on the first cache. In another embodiment, the operations also may include preventing a second downstream node coupled to the first downstream node from caching data from the first cache on a second cache coupled to the second downstream node.

A method of the present invention is also presented for synchronizing cache data. The method in the disclosed embodiments substantially includes the operations necessary to carry out the functions presented above with respect to the operation of the described apparatus and system. Furthermore, some or all of the operations of the method may be substantially similar to the operations that are performed when the program on the signal bearing medium is executed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Figure 2:
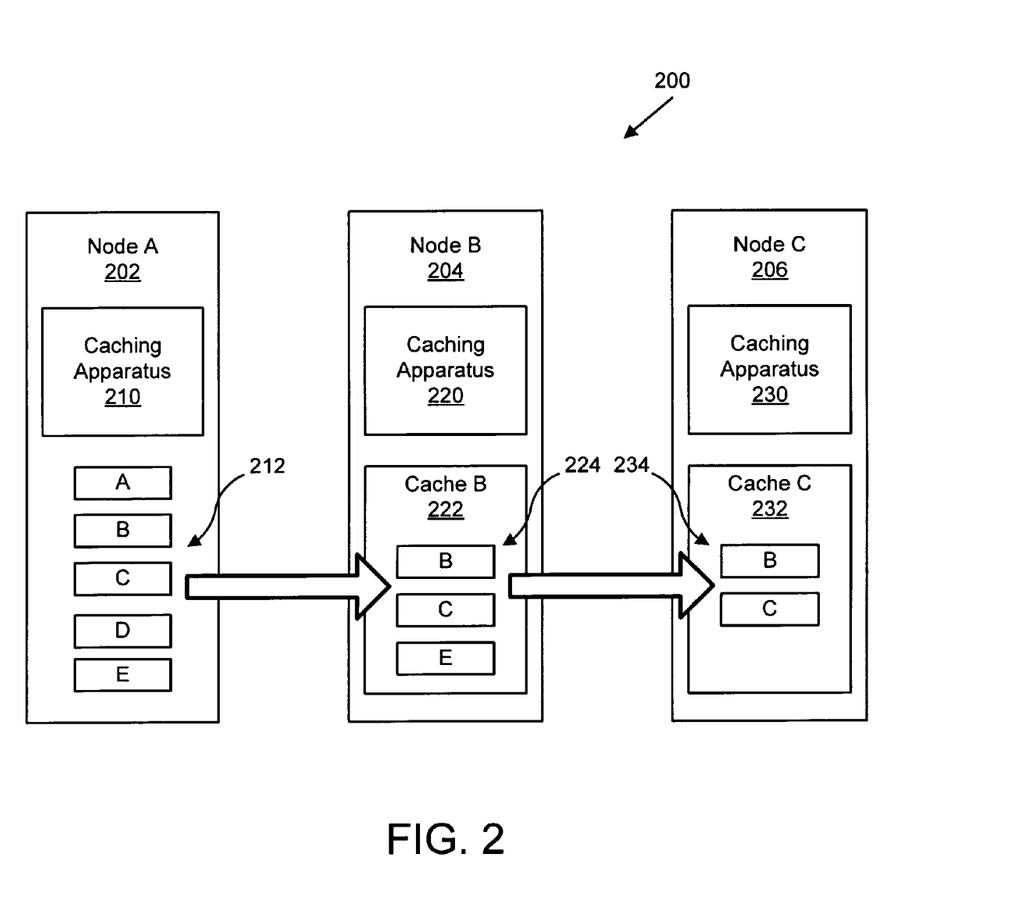
FIG. 2 is a schematic block diagram illustrating one embodiment of a distributed, multi-tier system.

FIG. 2 depicts one embodiment of distributed, multi-tier system 200. The illustrated multi-tier system 200 includes node A 202, node B 204, and node C 206. The designations of "A," "B," and "C" are used herein for convenience only and, in alternative embodiments, the nodes 202-206 may be designated with other indicators. The node A 202 also may be referred to as the first node, the upstream node, and so forth. Similarly, the node B 204 also may be referred to as the second node, the intermediate node, or the first downstream node. Likewise, the node C 206 also may be referred to as the third node, the downstream node, or the second downstream node. The context of the description and reference to a particular node 202-206 should render apparent which node 202-206 is described.

In another embodiment, the multi-tier system 200 may include more than three nodes 202-206 with additional upstream nodes (above node A 202), additional downstream nodes (below node C 206), and/or additional cluster nodes within a single tier, where each tier is represented by one of the depicted nodes 202-206. In certain embodiments, a distributed client-server architecture may be used across a single tier.

The node A 202, in one embodiment, includes a caching apparatus 210 and a plurality of data structures 212. The caching apparatus 210 may reside partially or wholly on the node A 202 or may be coupled to the node A 202 from a remote location. One example of a caching apparatus 210 is illustrated and described in more detail with reference to FIG. 3. The data structures 212 may include any type of data structure, including data files, executable files, directories, databases, and so forth, that may be stored on or accessible to the node A 202. The data structures 212 are designated as "A" through "E" for purposes of this description only. These data structures 212 also may be referred to as source data structures or simply source data.

The node B 204, in one embodiment, includes a caching apparatus 220 and a corresponding cache B 222. The caching apparatus 220 may be substantially similar to the caching apparatus 210 of the node A 202 and may reside on the node B 204 or may be coupled to the node B 204. Similarly, the cache B 222 may reside on the node B 204 or may be coupled to the node B 204 from a remote location. Additionally, the cache B 222 may be the only cache coupled to the node B 204 or may be one of many caches coupled to the node B 204. The cache B 222 includes one or more data structures 224 that are cached from the source data 212 coupled to the node A 202. The cache B 222 also may include other data structures 224 that are not directly cached from the source data 212.

The node C 206, in one embodiment, includes a caching apparatus 230 and a corresponding cache C 232. The caching apparatus 230 may be substantially similar to the caching apparatus 210 of the node A 202 and/or the caching apparatus 220 of the node B 204. Additionally, the caching apparatus 230 may reside on the node C 206 or may be coupled to the node C 206 from a remote location. Similarly, the cache C 232 may reside on the node C 206 or may be coupled to the node C 206 from a remote location. Furthermore, the cache C 232 may be the only cache coupled to the node C 206 or may be one of several caches coupled to the node C 206. The cache C 232 includes one or more data structures 234 that may be cached from the cached data 224 coupled to the node B 204, which cached data 224 is at least partially cached from the source data 212 coupled to the node A 202.

It can be seen from FIG. 2 that certain source data structures 212 are cached in multiple tiers of the multi-tier system 200. Therefore, in order to properly synchronize the source data structures 212 at the node A 202, it may be necessary to perform one or more cascading synchronization operations. For example, it may be necessary to synchronize the cached data 234 at the cache C 232 with the cached data 224 at the cache B 222 and, subsequently, to synchronize the cached data 224 at the cache B 222 with the source data 212 coupled to the node A 202.

Figure 3:
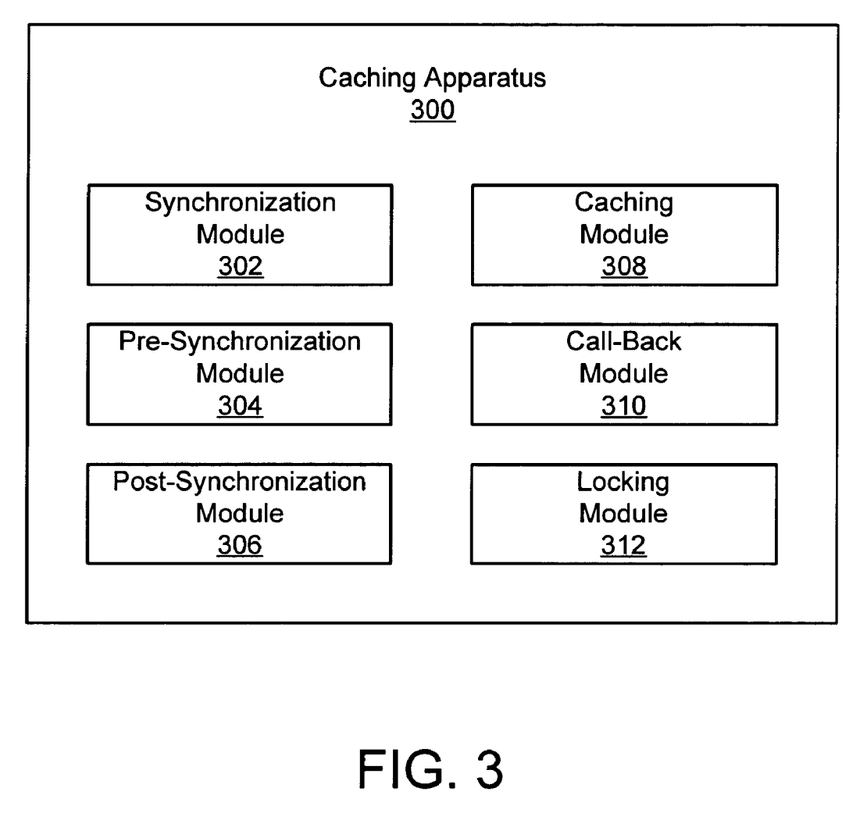
FIG. 3 is a schematic block diagram illustrating one embodiment of a caching apparatus.

FIG. 3 depicts one embodiment of a caching apparatus 300 that may be substantially similar to one or more of the caching apparatuses 210, 220, 230 of FIG. 2. The illustrated caching apparatus 300 includes a synchronization module 302, a pre-synchronization module 304, and a post-synchronization module 306. The illustrated caching apparatus 300 also includes a caching module 308, a call-back module 310, and a locking module 312.

In one embodiment, the synchronization module 302 synchronizes data from two nodes 202-206 in a client-server environment. The synchronization module 302 may perform the synchronization operations independently or in conjunction with another synchronization module 302 coupled to one of the nodes 202-206 involved in the synchronization operations. In another embodiment, the synchronization module 302 also may participate in administrative communications between the participating nodes 202-206 in order to manage the synchronization process. For example, where the synchronization module 302 is coupled to the intermediate node B 204, the synchronization module 302 may receive a synchronization call at the intermediate node B 204 from the upstream node A 202. In another example, the synchronization module 302 may facilitate cascading cache synchronization with two distinct nodes, such as an upstream node 202 and a downstream node 206.

In one embodiment, the pre-synchronization module 304, while coupled to an upstream node acting as a server, may send a pre-synchronization call to a downstream node acting as a client. In another embodiment, the pre-synchronization module 304, while coupled to a downstream node acting as a client, may receive a pre-synchronization call from an upstream node acting as a server. In a further embodiment, the pre-synchronization module 304 may send or receive a pre-synchronization acknowledgement to an upstream node or from a downstream node, respectively. The pre-synchronization acknowledgement, in one embodiment, indicates that the downstream node is ready to receive a synchronization call-back from the upstream node.

Similarly, in certain embodiments, the post-synchronization module 306 is configured to send or receive a post-synchronization call and/or a corresponding post-synchronization acknowledgement. By implementing pre- and post-synchronization communications between an upstream node and a downstream node, the caching apparatus 300 may avoid, for example, an inverted-locking model, which automatically considers locks granted while corresponding synchronization requests are pending. Furthermore, an intermediate node that receives a pre-synchronization call is provided with advance notice of the impending synchronization call, without the resulting lockdown of the intermediate cache and resulting system deadlock. In this way, an intermediate cache is provided with an opportunity to perform downstream synchronization before receiving or acknowledging the synchronization request for the upstream synchronization.

In one embodiment, the caching module 308 caches data from an upstream node in a local or remotely-coupled cache. For example, the caching module 308, while coupled to the intermediate node B 204, may cache source data 212 from the upstream node A 202 on the cache B 222.

In one embodiment, the call-back module 310 sends a synchronization call-back, or request, from one node to another. Additionally, the call-back module 310 may send a pre-synchronization call and/or a post-synchronization call from one node to another. In another embodiment, the call-back module 310 sends the synchronization, the pre-synchronization, and/or the post-synchronization call-back(s) in conjunction with the locking module 312, as described below.

In one embodiment, the locking module 312 locks and unlocks a cache coupled to a node. For example, the locking module 312 may lock the cache in response to a synchronization call-back from an upstream node. The locking module 312 also may unlock the cache in response to completion of the synchronization operations. By locking a cache, the locking module 312 prevents the node, to which the cache is coupled, or an application on the node from modifying some or all of the cached data within the cache. In particular, the locking module 312 prevents an application or user from accessing the data that is cached from an upstream node and that may be synchronized with the upstream data.

In one embodiment, the locking module 312 only locks a cache in response to a synchronization call-back from an upstream node and unlocks the cache prior to sending a synchronization completion notification to the upstream node. In a further embodiment, the locking module 312 may prevent locking of the cache during either the pre-synchronization or the post-synchronization communications. The interrelated operation of the locking module 312 and the call-back module 310, as well as the other modules 302-308 of the caching apparatus 300, is described in more detail with reference to the following figures.

Figure 4:
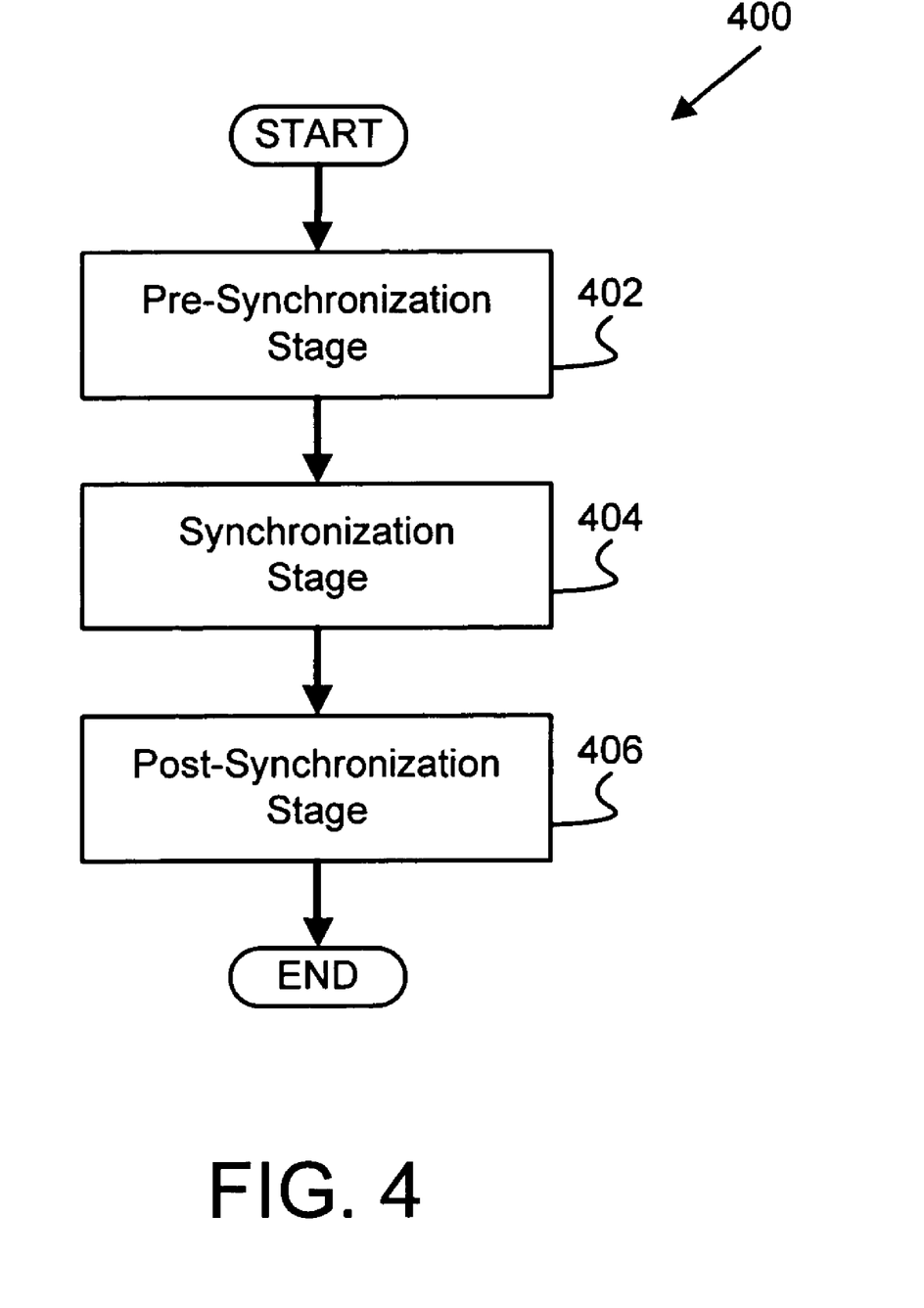
FIG. 4 is a schematic block diagram illustrating one embodiment of a synchronization method that may be implemented in conjunction with the caching apparatus of FIG. 3.

FIG. 4 depicts one embodiment of a synchronization method 400 that may be implemented in conjunction with the caching apparatus 300 of FIG. 3. In particular, the synchronization method 400 depicts the implementation of multiple synchronization stages between two nodes within a multi-tier architecture. In one embodiment, these stages may be implemented in a cascading manner for each client-server relationship within, for example, the multi-tier system 200 of FIG. 2.

The illustrated synchronization method 400 begins by implementing 402 a pre-synchronization stage in which pre-synchronization communications may occur between the upstream (e.g., server) and downstream (e.g., client) nodes. Once the pre-synchronization stage is completed, the synchronization stage is implemented 404, in which cached data coupled to the downstream node is synchronized with data coupled to the upstream node. Subsequent to the synchronization stage, the post-synchronization stage is implemented 406. As described above, the downstream cache is locked during the synchronization stage and is maintained unlocked during the pre- and post-synchronization stages.

Figure 5:
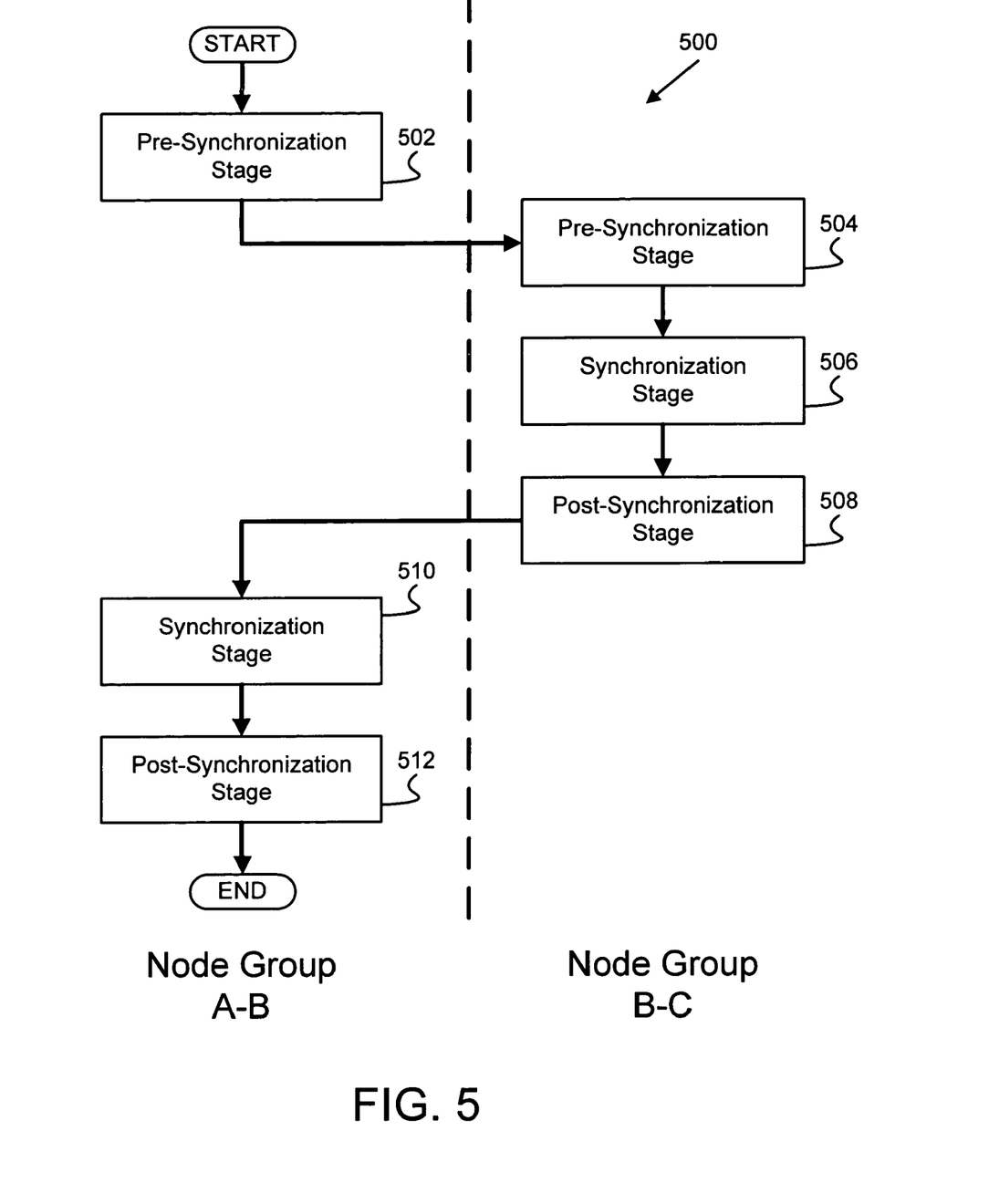
FIG. 5 is a schematic block diagram illustrating one embodiment of a cascading synchronization method that may be implemented on a multi-tier system.

FIG. 5 depicts one embodiment of a cascading synchronization method 500 that may be implemented in conjunction with the multi-tier system 200 of FIG. 2. In one embodiment, the cascading synchronization of downstream caches occurs during the pre-synchronization stage of upstream caches. Although the cascading synchronization method 500 is described herein with specific reference to the two node groups A-B and B-C (each representing a client-server relationship), the cascading synchronization method 500 maybe implemented for any number of nodes 202-206 and node groups.

The illustrated cascading synchronization method 500 begins as the upstream node A 202 initiates 502 a pre-synchronization stage for the upstream node group A-B. The caching apparatus 220 on the node B 204, recognizing the presence of the downstream node C 206, then initiates 504 a pre-synchronization stage for the downstream node group B-C. In other words, the node B 204 determines if there is a downstream node, namely the node C 206, that has cached date from the cache B 222. Subsequently, a synchronization stage and a post-synchronization stage are implemented 506, 508, respectively, for the downstream node group B-C.

After the post-synchronization stage for the downstream node group B-C completes, the node B 204 then informs the upstream node A 202 that the node B 204 is ready to synchronize with upstream node A 202. Subsequently, a synchronization stage and a post-synchronization stage are implemented 510, 512, respectively, for the upstream node group A-B. In this way, the downstream caches coupled to the downstream node group B-C are synchronized before the upstream node group A-B is allowed to synchronize and lock up the cache B 222.

Figure 6:
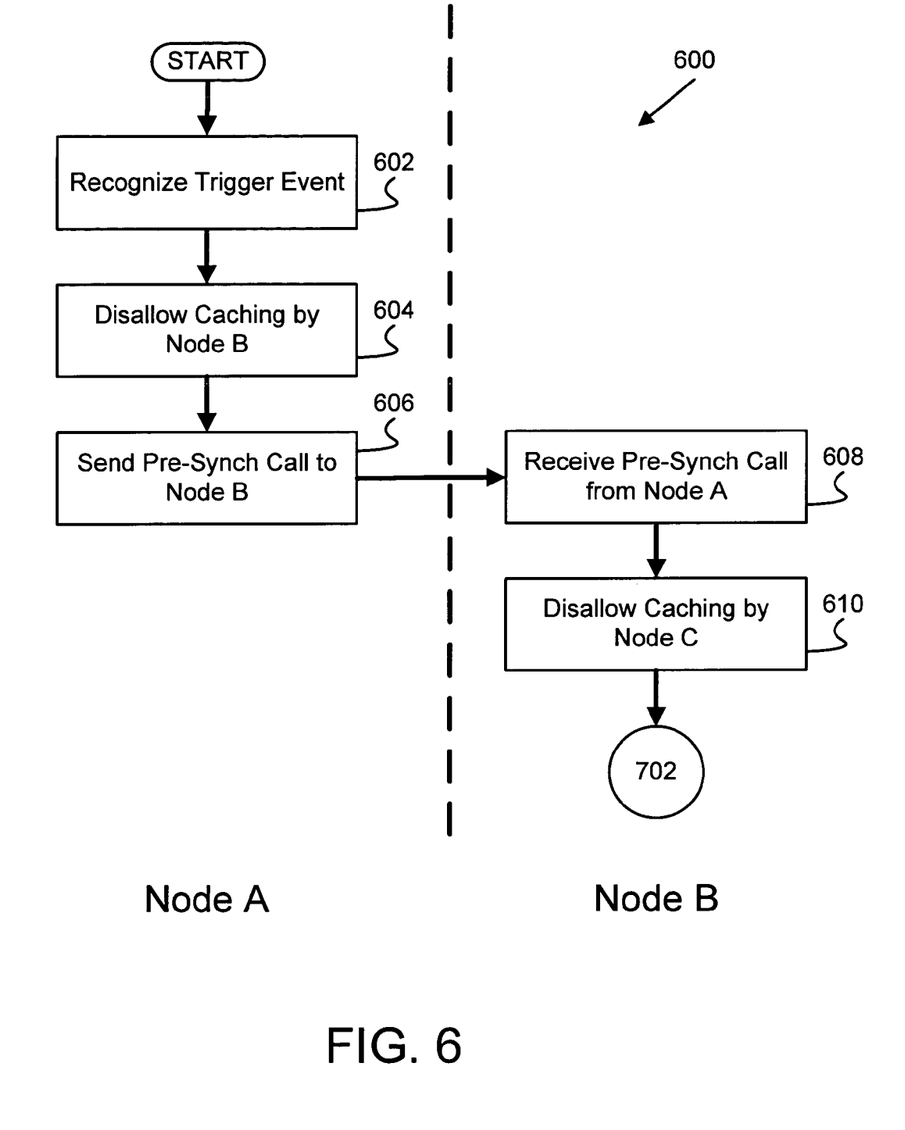
FIGS. 6 through 8 are a schematic block diagram illustrating a more detailed embodiment of a cascading synchronization method that may be implemented on a distributed, multi-tier system.
Figure 7:
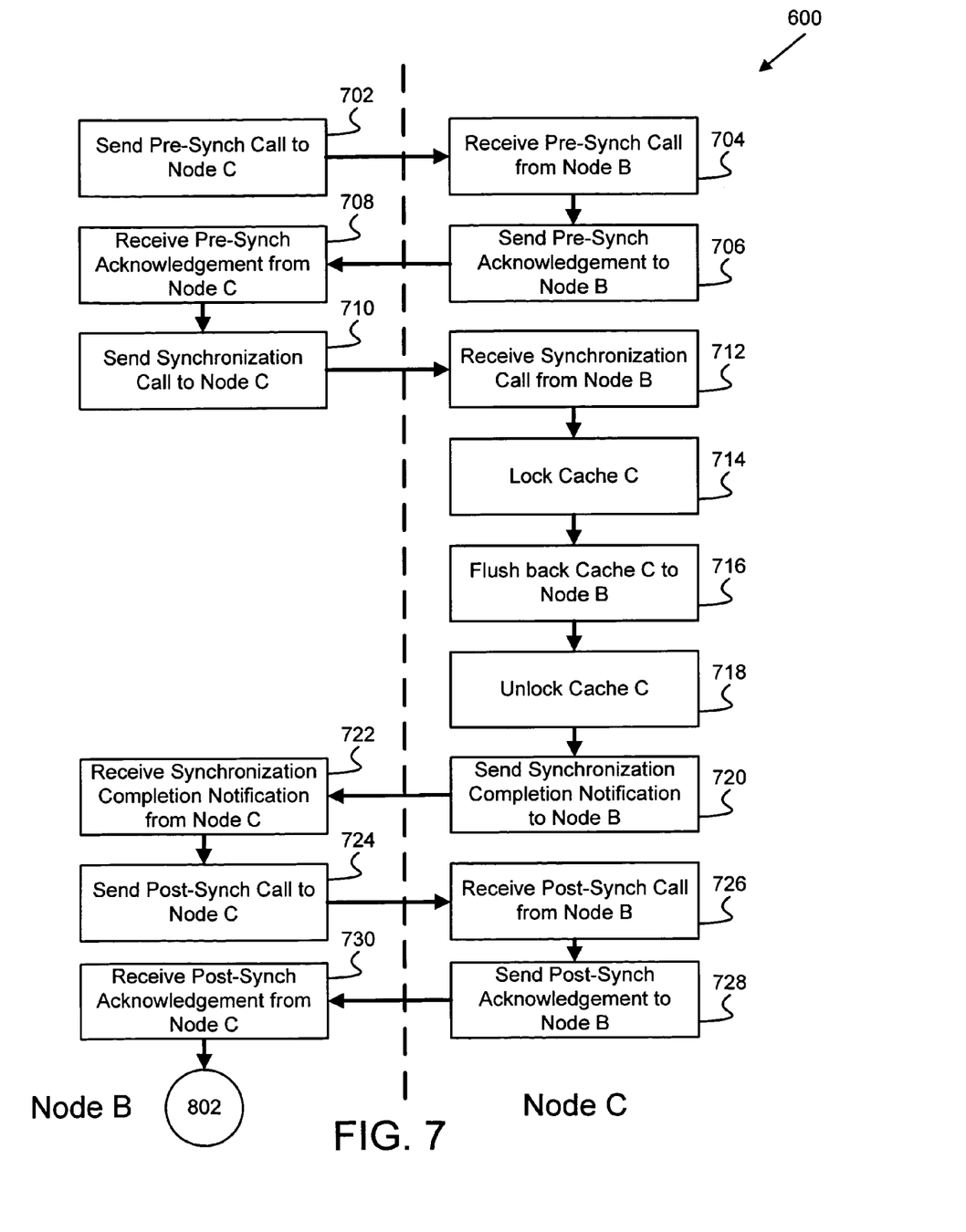
Figure 8:
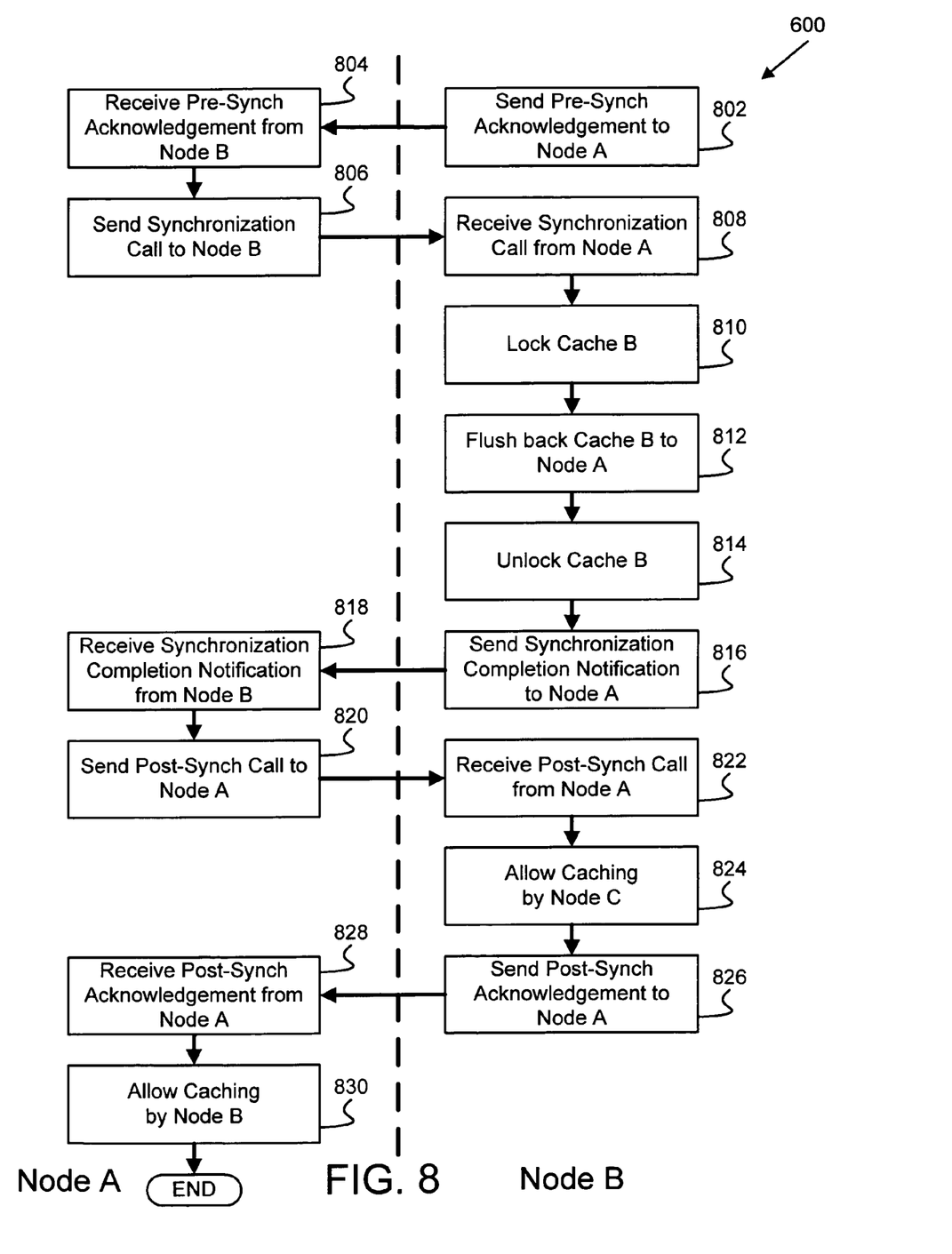

FIGS. 6 through 8 depict a more detailed embodiment of a cascading synchronization method 600 that may be implemented on a distributed, multi-tier system, such as the multi-tier system 200 of FIG. 2. In particular, FIGS. 6 and 8 depict one embodiment of the interface between the upstream node A 202 and the intermediate node B 204, within an upstream client-server relationship. Similarly, FIG. 7 depicts one embodiment of the interface between the intermediate node B 204 and the downstream node C 206.

Once again, although the cascading synchronization method 600 is described herein with specific reference to the nodes A, B, and C 202-206 (representing two multi-tier client-server relationships), the cascading synchronization method 600 maybe implemented within a multi-tier system 200 having more than three nodes 202-206 and/or having distributed or clustered tiers.

The illustrated cascading synchronization method 600 begins in response to a trigger event recognized 602 by the upstream node A 202. In one embodiment, the trigger event may be a data access request from another client or node. The upstream node A 202 subsequently disallows 604 further caching by the intermediate node B 204. In other words, the intermediate node B 204 is unable to cache some or all of the source data 212 coupled to the upstream node A 202, except the data is already cached before the upstream node A 202 disallows 604 caching by the intermediate node B 204. The upstream node A 202 then sends 606 a pre-synchronization call to the intermediate node B 204. In one embodiment, a pre-synchronization module 304 of the caching apparatus 210 coupled to the upstream node A 202 sends 606 the pre-synchronization call to the intermediate node B 204. In another embodiment, the call-back module 310 of the caching apparatus 210 coupled to the upstream node A 202 may send 606 the pre-synchronization call.

The intermediate node B 204 then receives 608 the pre-synchronization call from the upstream node A 202. In one embodiment, a pre-synchronization module 304 of the caching apparatus 220 coupled to the intermediate node B 204 receives 608 the pre-synchronization call from the upstream node A 202. In response to the pre-synchronization call, the intermediate node B 204 subsequently disallows 610 caching by the downstream node C 206 of the cached data 224 stored in the cache B 222. The illustrated cascading synchronization method 600 then continues as depicted in FIG. 7.

After the intermediate node B 204 disallows 610 caching by the downstream node C 206, the intermediate node B 204 sends 702 a pre-synchronization call to the downstream node C 206. In one embodiment, either the pre-synchronization module 304 or a call-back module 310 of the caching apparatus 220 coupled to the intermediate node B 204 sends 702 the pre-synchronization call to the downstream node C 206.

The downstream node C 206 then receives 704 the pre-synchronization call from the intermediate node B 204 and, because there are no additional downstream nodes, sends 706 a pre-synchronization acknowledgement to the intermediate node B 204. In one embodiment, a pre-synchronization module 304 of the caching apparatus 230 coupled to the downstream node C 206 receives 704 the pre-synchronization call from and sends 706 the pre-synchronization acknowledgement to the intermediate node B 204.

The intermediate node B 204 then receives 708 the pre-synchronization acknowledgement from the downstream node C 206 and, subsequently, sends 710 a synchronization call to the downstream node C 206. Alternatively, the intermediate node B 204 may determine, in response to receiving the pre-synchronization call from the downstream node C 206, whether or not the cache C 232 needs to be synchronized with the cache B 222. In one embodiment, the pre-synchronization module 304 of the caching apparatus 220 coupled to the intermediate node B 204 receives 708 the pre-synchronization acknowledgement and either a synchronization module 302 or the call-back module 310 of the caching apparatus 220 coupled to the downstream node B 204 sends 710 the synchronization call.

In response to receiving 712 the synchronization call from the intermediate node B 204, the downstream node C 206 may lock 714 the cache C 232 so that the cached data 234 coupled to the downstream node C 206 cannot be modified. In one embodiment, a synchronization module 302 of the caching apparatus 230 coupled to the downstream node C 206 receives 712 the synchronization call from the intermediate node B 204. While the cache C 232 is locked, the cached data 234 in the cache C 232 is flushed 716 back to the cache B 222, which is coupled to the intermediate node B 204.

After the data 234 is flushed 716 back to the cache B 222, the downstream node C 206 may unlock 718 the cache C 232. In one embodiment, a locking module 312 of the caching apparatus 230 coupled to the downstream node C 206 may lock 714 and unlock 718 the cache C 232. Furthermore, a synchronization module 302 of the caching apparatus 230 coupled to the downstream node C 206 may facilitate the data flush 716.

The downstream node C 206 subsequently sends 720 a synchronization completion notification to the intermediate node B 204 to indicate that the cached data 234 of the cache C 232 was successfully flushed 716 back to the cache B 222. In one embodiment, the synchronization module 302 of the caching apparatus 230 coupled to the downstream node C 206 sends 720 the synchronization completion notification to the intermediate node B 204.

The intermediate node B 204 then receives 722 the synchronization completion notification from the downstream node C 206 and sends 724 a post-synchronization call to the downstream node C 206. In one embodiment, the synchronization module 302 and a post-synchronization module 306 of the caching apparatus 220 coupled to the intermediate node B 204 receives 722 the synchronization completion notification and sends 724 the post-synchronization call, respectively. Upon receiving 726 the post-synchronization call, the downstream node C 206 then sends 728 a post-synchronization acknowledgement to the intermediate node B 204. In one embodiment, a post-synchronization module 306 of the caching apparatus 230 coupled to the downstream node C 206 receives 726 the post-synchronization call and sends 728 the post-synchronization acknowledgement.

The intermediate node B 204 then receives 730 the post-synchronization acknowledgement from the downstream node C 206 and the interface between the intermediate node B 204 and the downstream node C 206 ends. In one embodiment, the post-synchronization module 306 of the caching apparatus 220 coupled to the intermediate node B 204 receives 730 the post-synchronization acknowledgement from the downstream node C 206. The illustrated cascading synchronization method 600 then continues as depicted in FIG. 8.

After the intermediate node B 204 receives 730 the post-synchronization acknowledgement from the downstream node C 206, the intermediate node B 204 sends 802 a pre-synchronization acknowledgement to the upstream node A 202. In one embodiment, the pre-synchronization module 304 of the caching apparatus 220 coupled to the intermediate node B 204 sends 802 the pre-synchronization acknowledgement to the upstream node A 202.

The upstream node A 202 then receives 804 the pre-synchronization acknowledgement from the intermediate node B 204 and, subsequently, sends 806 a synchronization call to the intermediate node B 204. In one embodiment, the pre-synchronization module 304 of the caching apparatus 210 coupled to the upstream node A 202 receives 804 the pre-synchronization acknowledgement and either the synchronization module 302 or the call-back module 310 of the caching apparatus 210 coupled to the upstream node A 202 sends 806 the synchronization call.

In response to receiving 808 the synchronization call from the upstream node A 202, the intermediate node B 204 may lock 810 the cache B 222 so that the cached data 224 coupled to the intermediate node B 204 cannot be modified. In one embodiment, the synchronization module 302 of the caching apparatus 220 coupled to the intermediate node B 204 receives 808 the synchronization call from the upstream node A 202. While the cache B 222 is locked, the cached data 224 in the cache B 222 is flushed 812 back to the upstream node A 202.

After the data 224 is flushed 812 back to the upstream node A 202, the intermediate node B 204 may unlock 814 the cache B 222. In one embodiment, a locking module 312 of the caching apparatus 220 coupled to the intermediate node B 204 may lock 810 and unlock 814 the cache B 222. Furthermore, the synchronization module 302 of the caching apparatus 220 coupled to the intermediate node B 204 may facilitate the data flush 812.

The intermediate node B 204 subsequently sends 816 a synchronization completion notification to the upstream node A 202 to indicate that the cached data 224 of the cache B 222 was successfully flushed 812 back to the upstream node A 202. In one embodiment, the synchronization module 302 of the caching apparatus 220 coupled to the intermediate node B 204 sends 816 the synchronization completion notification to the upstream node A 202.

The upstream node A 202 then receives 818 the synchronization completion notification from the intermediate node 204 and sends 820 a post-synchronization call to the upstream node A 202. In one embodiment, the synchronization module 302 and a post-synchronization module 306 of the caching apparatus 210 coupled to the upstream node A 202 receives 818 the synchronization completion notification and sends 820 the post-synchronization call, respectively. Upon receiving 822 the post-synchronization call, the intermediate node B 204 then re-enables 824 caching by the downstream node C 206 and sends 826 a post-synchronization acknowledgement to the upstream node A 202. Alternatively, the node B 204 may re-enable 824 caching by the downstream node C 206 after the node B 204 sends 816 the synchronization completion notification. In one embodiment, the post-synchronization module 306 of the caching apparatus 220 coupled to the intermediate node C 204 receives 822 the post-synchronization call and sends 826 the post-synchronization acknowledgement.

The upstream node A 202 then receives 828 the post-synchronization acknowledgement from the intermediate node B 204 and re-enables 830 caching by the intermediate node B 204. The interface between the upstream node A 202 and the intermediate node B 204 then ends and the illustrated cascading synchronization method 600 ends. In one embodiment, the post-synchronization module 306 of the caching apparatus 210 coupled to the upstream node A 202 receives 828 the post-synchronization acknowledgement from the intermediate node B 204.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to synchronize cache data of cascading caches within
   a multi-tier system, the apparatus comprising:
   a storage device storing executable code;
   a processor executing the executable code, the executable code comprising
   a pre-synchronization module performing a step of receiving a first pre-synchronization call from an upstream node of an upstream tier coupled to an intermediate node of an intermediate tier, the first pre-synchronization call providing advance notice to the intermediate node of an impending synchronization call;

the pre-synchronization module performing a step of preventing a second cache coupled to a downstream node of a downstream tier from caching data from a first cache coupled to the intermediate node in response to the receiving of the first pre-synchronization call while the first cache remains unlocked until locked in response to the receiving of a first synchronization call-back from the upstream node;

the pre-synchronization module performing a step of sending a second pre-synchronization call from the intermediate node to the downstream node in response to the receiving of the first pre-synchronization call;

the downstream node performing a step of sending a second pre-synchronization acknowledgement to the intermediate node in response to the receiving of the second pre-synchronization call;

the pre-synchronization module performing a step of receiving the second pre-synchronization acknowledgement from the downstream node;

a call-back module performing a step of sending a second synchronization call-back from the intermediate node to the downstream node in response to receiving the second pre-synchronization acknowledgement by the intermediate node;

a locking module performing a step of locking the second cache in response to the receiving of the second synchronization call-back;

a synchronization module performing a step of synchronizing the second cache with the first cache in response to locking the second cache;

the locking module performing a step of unlocking the second cache in response to synchronizing the second cache with the first cache;

the locking module performing a step of sending a first synchronization completion from the downstream node to the intermediate node in response to synchronizing the second cache with the first cache;

the pre-synchronization module further performing a step of sending a first pre-synchronization acknowledgement from the intermediate node to the upstream node in response to the receiving of the synchronization completion;

the upstream node performing a step of sending the first synchronization call-back to the intermediate node in response to the first pre-synchronization acknowledgement;

the locking module performing a step of locking the first cache in response to the receiving of the first synchronization call-back from the upstream node;

the synchronization module performing a step of synchronizing source data on the upstream node with cached data on the first cache in response to locking the first cache;

the locking module performing a step of unlocking the first cache in response to synchronizing the source data;

the locking module performing a step of sending a second synchronization completion from the intermediate node to the upstream node in response to synchronizing the source data with the cached data;

the upstream module performing a step of sending a post synchronization call-back to the intermediate node in response to the receiving of the second synchronization completion;

a post-synchronization module performing a step of receiving the post synchronization call-back at the intermediate node and allowing caching by the second cache in response to the receiving of the post synchronization call-back;

the post-synchronization module performing a step of sending a post synchronization acknowledgment from the intermediate node to the upstream node; and the upstream node performing a step of allowing the first cache to cache data from the source data in response to the post synchronization acknowledgement.

2. The apparatus of claim 1, wherein the call-back module performing a step of sending the second synchronization call-back before the first cache is locked.

3. The apparatus of claim 1, wherein locking the first cache comprises preventing the intermediate node from modifying the cached data on the first cache.

4. The apparatus of claim 1, wherein the locking the first cache further prevents the downstream node from caching data from the first cache on the second cache.

5. A system to synchronize cache data of cascading caches within a multi-tier system, the system comprising:

an upstream node of an upstream tier, the upstream nodes having source data and comprising a processor and a storage device;

an intermediate node of an intermediate tier coupled to the upstream node, wherein the intermediate tier comprises a processor and a storage device and is downstream of the upstream tier, the intermediate node coupled to a first cache having the source data from the upstream node cached thereon;

a downstream node of a downstream tier coupled to the intermediate node, wherein the downstream tier comprises a processor and a storage device and is downstream of the intermediate tier, the downstream node coupled to a second cache having data from the first cache, including the source data from the upstream node, cached thereon; and a caching apparatus coupled to the intermediate node, the caching apparatus synchronizing the cached data on the second cache with the cached data on the first cache prior to synchronizing the cached data on the first cache with the source data by performing the steps of:

receiving a first pre-synchronization call from the upstream node to the intermediate node, the first pre-synchronization call providing advance notice to the intermediate node of an impending synchronization call;

preventing the second cache caching data from the first cache coupled in response to the receiving of the first pre-synchronization call while the first cache remains unlocked until locked in response to the receiving of a first synchronization call-back from the upstream node;

sending a second pre-synchronization call from the intermediate node to the downstream node in response to the receiving of the first pre-synchronization call;

sending a second pre-synchronization acknowledgement from the downstream node to the intermediate node in response to the receiving of the second pre-synchronization call;

receiving a second pre-synchronization acknowledgement from the downstream node;

sending a second synchronization call-back from the intermediate node to the downstream node in response to receiving the second pre-synchronization acknowledgement by the intermediate node;

locking the second cache in response to the receiving of the second synchronization call-back;

synchronizing the second cache with the first cache in response to locking the second cache;

unlocking the second cache in response to synchronizing the second cache with the first cache;

sending a first synchronization completion from the downstream node to the intermediate node in response to synchronizing the second cache with the first cache;

sending a first pre-synchronization acknowledgement from the intermediate node to the upstream node in response to the receiving of the first synchronization completion;

sending the first synchronization call-back from the upstream module to the intermediate node in response to the receiving of the first pre-synchronization acknowledgement;

locking the first cache in response to the receiving of the first synchronization call-back from the upstream node;

synchronizing source data on the upstream node with cached data on the first cache after the first cache is locked;

unlocking the first cache in response to synchronizing the source data;

sending a second synchronization completion from the intermediate node to the upstream node in response to synchronizing the source data with the cached data;

sending a post synchronization call-back from the upstream module to the intermediate node in response to the second synchronization completion;

receiving the post synchronization call-back at the intermediate node; allowing caching by the second cache in response to the receiving of the post synchronization call-back;

sending a post synchronization acknowledgment from the intermediate node to the upstream node; and allowing the first cache to cache data from the source data in response to the receiving of the post synchronization acknowledgement.

6. A computer readable storage medium tangibly embodying a semiconductor device storing a program of executable code executed by a processor to perform operations to synchronize cache data of cascading caches within a multi-tier system, the operations comprising:

receiving a first pre-synchronization call from an upstream node of an upstream tier coupled to an intermediate node of an intermediate tier, the first pre-synchronization call providing advance notice to the intermediate node of an impending synchronization call;

preventing a second cache coupled to a downstream node of a downstream tier caching data from a first cache coupled to the intermediate node in response to the receiving of the first pre-synchronization call while the first cache remains unlocked until locked in response to the receiving of a first synchronization call-back from the upstream node;

sending a second pre-synchronization call from the intermediate node to the downstream node in response to the receiving of the first pre-synchronization call;

sending a second pre-synchronization acknowledgement from the downstream node to the intermediate node in response to the receiving of the second pre-synchronization call;

receiving a second pre-synchronization acknowledgement from the downstream node;

sending a second synchronization call-back from the intermediate node to the downstream node in response to receiving the second pre-synchronization acknowledgement by the intermediate node;

locking the second cache in response to the second synchronization call-back;

synchronizing the second cache with the first cache in response to locking the second cache;

unlocking the second cache in response to synchronizing the second cache with the first cache;

sending a synchronization completion from the downstream node to the intermediate node in response to synchronizing the second cache with the first cache;

sending a first pre-synchronization acknowledgement from the intermediate node to the upstream node in response to the receiving of the synchronization completion;

sending the first synchronization call-back from the upstream module to the intermediate node in response to the receiving of the first pre-synchronization acknowledgement;

locking the first cache in response to the receiving of the first synchronization call-back from the upstream node;

synchronizing source data on the upstream node with cached data on the first cache after the first cache is locked;

unlocking the first cache in response to synchronizing the source data;

sending a first synchronization completion from the intermediate node to the upstream node in response to synchronizing the source data with the cached data;

sending a post synchronization call-back from the upstream module to the intermediate node in response to the receiving of the first synchronization completion;

receiving the post synchronization call-back at the intermediate node;

allowing caching by the second cache in response to the receiving of the post synchronization call-back;

sending a post synchronization acknowledgment from the intermediate node to the upstream node; and allowing the first cache to cache data from the source data in response to the receiving of the post synchronization acknowledgement.

7. The computer readable storage medium of claim 6, further comprising an operation to cache the source data from the upstream node on the first cache of the intermediate node.

8. The computer readable storage medium of claim 6, wherein locking the first cache prevents the intermediate node from modifying the cached data on the first cache and prevents the downstream node from caching data from the first cache on the second cache.

9. A method for synchronizing cache data of cascading caches within a multi-tier system, the method comprising:

receiving a first pre-synchronization call from an upstream node of an upstream tier coupled to an intermediate node of an intermediate tier, the first pre-synchronization call providing advance notice to the intermediate node of an impending synchronization call;

preventing by use of a processor, a second cache coupled to a downstream node of a downstream tier caching data from a first cache coupled to the intermediate node in response to the first pre-synchronization call while the first cache remains unlocked until locked in response to a first synchronization call-back from the upstream node;

sending a second pre-synchronization call from the intermediate node to the downstream node in response to the receiving of the first pre-synchronization call;

sending a second pre-synchronization acknowledgement from the downstream node to the intermediate node in response to the receiving of the second pre-synchronization call;

receiving a second pre-synchronization acknowledgement from the downstream node; sending a second synchronization call-back from the intermediate node to the downstream node in response to receiving the second pre-synchronization acknowledgement;

locking the second cache in response to the second synchronization call-back; synchronizing, by use of a processor, the second cache with the first cache in response to locking the second cache;

unlocking the second cache in response to synchronizing the second cache with the first cache;

sending a synchronization completion from the downstream node to the intermediate node in response to synchronizing the second cache with the first cache;

sending a first pre-synchronization acknowledgement from the intermediate node to the upstream node in response to the receiving of the synchronization completion;

sending the first synchronization call-back from the upstream module to the intermediate node in response to the receiving of the first pre-synchronization acknowledgement;

locking the first cache in response to the receiving of the first synchronization call-back from the upstream node;

synchronizing, by use of a processor, source data on the upstream node with cached data on the first cache after the first cache is locked;

unlocking the first cache in response to synchronizing the source data;

sending a synchronization completion from the intermediate node to the upstream node in response to synchronizing the source data with the cached data;

sending a post synchronization call-back from the upstream module to the intermediate node in response to the receiving of the synchronization completion;

receiving the post synchronization call-back at the intermediate node;

allowing caching by the second cache in response to the receiving of the post synchronization call-back;

sending a post synchronization acknowledgment from the intermediate node to the upstream node; and allowing the first cache to cache data from the source data in response to the receiving of the post synchronization acknowledgement.

10. The apparatus of claim 1, the downstream node performing a step of sending a third pre-synchronization call to a second downstream node in response to receiving the second pre-synchronization call.

11. The apparatus of claim 10, the downstream node performing a step of sending the second pre-synchronization acknowledgement to the intermediate node in response to receiving a second synchronization completion from the second downstream node.

12. The system of claim 5, the downstream node performing a step of sending a third pre-synchronization call to a second downstream node in response to receiving the second pre-synchronization call.

13. The system of claim 12, the downstream node performing a step of sending the second pre-synchronization acknowledgement to the intermediate node in response to receiving a second synchronization completion from the second downstream node.

14. The computer readable storage medium of claim 6, the operation further comprising downstream node sending a third pre-synchronization call to a second downstream node in response to receiving the second pre-synchronization call.

15. The computer readable storage medium of claim 14, wherein the operation further comprising downstream node sending the second pre-synchronization acknowledgement to the intermediate node in response to receiving a second synchronization completion from the second downstream node.

16. The method of claim 9, the method further comprising sending a third pre-synchronization call to a second downstream node in response to receiving the second pre-synchronization call.

17. The method of claim 16, the method further comprising node sending the second pre-synchronization acknowledgement to the intermediate node in response to receiving a second synchronization completion from the second downstream node.

18. The system of claim 5, wherein locking the first cache comprises preventing the intermediate node from modifying the cached data on the first cache and preventing the downstream node from caching data from the first cache on the second cache.

19. The method of claim 9, wherein locking the first cache comprises preventing the intermediate node from modifying the cached data on the first cache and preventing the downstream node from caching data from the first cache on the second cache.

* * * * *